United States Patent
Branson et al.

(10) Patent No.: US 9,996,585 B2
(45) Date of Patent: *Jun. 12, 2018

(54) SUPPLEMENTING A TUPLE WITH A DERIVED VALUE

(71) Applicant: International Business Machines Corporation, Armonk, NY (US)

(72) Inventors: Michael J. Branson, Rochester, MN (US); Bradford L. Cobb, Katy, TX (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/213,437

(22) Filed: Jul. 19, 2016

(65) Prior Publication Data

US 2016/0328489 A1    Nov. 10, 2016

Related U.S. Application Data

(63) Continuation of application No. 14/528,003, filed on Oct. 30, 2014, now Pat. No. 9,471,707, which is a
(Continued)

(51) Int. Cl.
  *G06F 7/00*   (2006.01)
  *G06F 17/30*  (2006.01)
  *H04L 29/06*  (2006.01)

(52) U.S. Cl.
  CPC .. *G06F 17/30516* (2013.01); *G06F 17/30303* (2013.01); *G06F 17/30958* (2013.01); *H04L 69/16* (2013.01)

(58) Field of Classification Search
  USPC ........................ 707/713, 755, 708
  See application file for complete search history.

(56) References Cited

U.S. PATENT DOCUMENTS 5,963,933 A   10/1999  Cheng et al.
7,613,848 B2  11/2009  Amini et al.
(Continued)

OTHER PUBLICATIONS

Ballard et al., "IBM InfoSphere Streams: Harnessing Data in Motion", Sep. 2010, 360 pages, IBM Redbooks. http://www.redbooks.ibm.com/abstracts/sg247865.html.
(Continued)

*Primary Examiner* — Cheyne D Ly
(74) *Attorney, Agent, or Firm* — Nicholas D. Bowman

(57) ABSTRACT

A stream of tuples are processed by a plurality of processing elements, each including one or more stream operators, operating on computer processors. A method determines whether a first stream operator includes a first operation that is deterministic and whether a second stream operator includes a second operation that is equivalent to the first operation. In response to determining that the first operation is deterministic and the second operation is equivalent to the first operation, the first stream operator is configured to include in a tuple output from the first stream operator a result of performing the first operation using a first input. The second stream operator, which uses a second input when performing the second operation, determines whether the second input is the same as the first input, and uses the result in lieu of performing the second operation when the first and second inputs are the same.

16 Claims, 8 Drawing Sheets

Related U.S. Application Data continuation of application No. 14/318,777, filed on Jun. 30, 2014, now Pat. No. 9,460,235.

(56) References Cited

U.S. PATENT DOCUMENTS

| | | | |
|---|---|---|---|
| 7,644,110 B2 | 1/2010 | Nishizawa et al. | |
| 8,095,690 B2 | 1/2012 | Kashiyama et al. | |
| 8,180,914 B2* | 5/2012 | Klein | G06F 17/30516 709/231 |
| 8,560,526 B2 | 10/2013 | Santosuosso et al. | |
| 8,990,416 B2* | 3/2015 | Shukla | G06F 17/30516 709/224 |
| 9,756,104 B2* | 9/2017 | Shukla | H04L 65/602 |
| 2006/0277230 A1 | 12/2006 | Nishizawa et al. | |
| 2007/0288635 A1 | 12/2007 | Gu et al. | |
| 2007/0299980 A1 | 12/2007 | Amini et al. | |
| 2008/0028095 A1 | 1/2008 | Lang et al. | |
| 2008/0168179 A1 | 7/2008 | Gu et al. | |
| 2008/0238923 A1 | 10/2008 | Liu et al. | |
| 2008/0275891 A1 | 11/2008 | Park et al. | |
| 2009/0171890 A1 | 7/2009 | Johnson et al. | |
| 2009/0228434 A1 | 9/2009 | Krishnamurthy et al. | |
| 2011/0131198 A1 | 6/2011 | Johnson et al. | |
| 2011/0196856 A1 | 8/2011 | Chen et al. | |
| 2011/0314019 A1* | 12/2011 | Jimenez Peris | G06F 9/5066 707/737 |
| 2012/0143811 A1 | 6/2012 | Proctor et al. | |
| 2012/0218268 A1 | 8/2012 | Accola et al. | |
| 2013/0031335 A1 | 1/2013 | Santosuosso et al. | |
| 2013/0166888 A1* | 6/2013 | Branson | G06F 9/30 712/220 |
| 2013/0166948 A1* | 6/2013 | Branson | G06F 11/3433 714/15 |
| 2015/0293512 A1* | 10/2015 | Egge | G06F 17/5036 703/2 |
| 2015/0381681 A1 | 12/2015 | Branson et al. | |
| 2015/0381683 A1 | 12/2015 | Branson et al. | |

OTHER PUBLICATIONS

Carriero Jr., "Implementation of Tuple Space Machines", IP.Com Prior Art Database, IP.Com No. IPCOM000161331D, Electronic Publication Dec. 9, 2007, 103 pages, Copyright © Software Patent Institute. (Original Publication Dec. 31, 1987). http://www.ip.com/IPCOM000161331D.

Chen et al., "Generalized UDF for Analytics Inside Database Engine", Web-Age Information Management; Proceedings 11th International Conference, WAIM 2010, 15 pages, 2010, Springer, Berlin, Germany.

Branson et al., "Supplementing a Tuple With a Derived Value", U.S. Appl. No. 15/213,443, filed Jul. 19, 2016.

IBM, List of IBM Patents or Patent Applications Treated as Related, Jul. 15, 2016, 2 pages.

* cited by examiner

SUPPLEMENTING A TUPLE WITH A DERIVED VALUE

FIELD

This disclosure generally relates to stream computing, and in particular, to computing applications that receive streaming data and process the data as it is received.

BACKGROUND

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, system, and computer program product for processing data. The method, system, and computer program product receive two or more tuples to be processed by a plurality of processing elements operating on one or more computer processors.

In various embodiments, a method for processing a stream of tuples is directed to receiving a stream of tuples to be processed by a plurality of processing elements operating on one or more computer processors. Each processing element includes one or more stream operators. The stream operators are arranged in an operator graph. The method can include determining whether a first stream operator includes a first operation that is deterministic. In addition, the method can include determining whether a second stream operator includes a second operation that is equivalent to the first operation. In response to determining that the first operation is deterministic and the second operation is equivalent to the first operation, the method can further include configuring the first and second stream operators. The first stream operator can be configured to include in a tuple output from the first stream operator a result of performing the first operation using a first input. The second stream operator can be configured to determine whether a second input is the same as the first input, wherein the second stream operator is configured to use the second input when performing the second operation. In addition, the second stream operator can be configured to use the result in lieu of performing the second operation when the second input is the same as the first input.

Various embodiments of a method can further include determining whether the first operation is resource intensive. In addition, various embodiments can include determining whether an estimate of processing resources savings from omitting performance of the second operation is greater than an estimate of a cost imposed on a network from inclusion in the tuple output from the first stream operator the result of performing the first operation. Moreover, in various embodiments, the configuring the first stream operator to include in a tuple output from the first stream operator a result of performing the first operation can further include including the result in a hidden field of the tuple. Further, in various embodiments the configuring the first stream operator to include in a tuple output from the first stream operator a result of performing the first operation can further include including data for determining whether the second input is the same as the first input. In other embodiments, the method can include determining that the second stream operator is downstream of the first stream operator.

In various embodiments of a method, the determining whether a first stream operator includes a first operation that is deterministic, the determining whether a second stream operator includes a second operation that is equivalent to the first operation, and the configuring of the first and second stream operators can be performed at run time.

In various embodiments of a method, the determining whether a first stream operator includes a first operation that is deterministic, the determining whether a second stream operator includes a second operation that is equivalent to the first operation, and the configuring the second stream operator to determine whether a second input is the same as the first input are performed at compile time. Moreover, in response to detecting a change to the operator graph at run time after the compile time, the following can be repeated: Determining whether a first stream operator includes a first operation that is deterministic, determining whether a second stream operator includes a second operation that is equivalent to the first operation, and in response to determining that the first operation is deterministic and the second operation is equivalent to the first operation. In addition, the following can be repeated: the configuring the first stream operator to include in a tuple output from the first stream operator a result of performing the first operation using a first input. Further, the configuring the second stream operator to determine whether a second input is the same as the first input, wherein the second stream operator is configured to use the second input when performing the second operation, and to use the result in lieu of performing the second operation when the second input is the same as the first input can be repeated.

Various embodiments are directed to a system for processing a stream of tuples that includes a plurality of processing elements configured to receive a stream of tuples. The processing elements operate on one or more computer processors. Each processing element has one or more stream operators. The stream operators are arranged in an operator graph. The system includes a component to determine whether a first stream operator includes a first operation that is deterministic. The component can also determine whether a second stream operator includes a second operation that is equivalent to the first operation. In addition, the component can, in response to determining that the first operation is deterministic and the second operation is equivalent to the first operation, configure the first and second stream operators. The first stream operator can be configured by the component to include in a tuple output from the first stream operator a result of performing the first operation using a first input. The second stream operator can be configured by the component to determine whether a second input is the same as the first input, wherein the second stream operator is configured to use the second input when performing the second operation, and to use the result in lieu of performing the second operation when the second input is the same as the first input.

In various embodiments, the component further determines whether the first operation is resource intensive. In addition, in various embodiments, the component determines whether an estimate of processing resources savings from omitting performance of the second operation is greater than an estimate of a cost imposed on a network from inclusion in the tuple output from the first stream operator the result of performing the first operation. The configuring the first stream operator to include in a tuple output from the first stream operator a result of performing the first operation further comprises including the result in a hidden field of the tuple in various embodiments. The configuring the first stream operator to include in a tuple output from the first stream operator a result of performing the first operation further comprises including data for determining whether the second input is the same as the first input in various embodiments. Further, in various embodiments, the component can determine that the second stream operator is downstream of the first stream operator.

In various embodiments, the component is a stream manager. The stream manager can determine whether a first stream operator includes a first operation that is deterministic. In addition, the stream manager can determine whether a second stream operator includes a second operation that is equivalent to the first operation. In various embodiments, the stream manager can configure the first and second stream operators at run time.

In various embodiments, the component is a compiler. The compiler can determine whether a first stream operator includes a first operation that is deterministic. In addition, the compiler can determine whether a second stream operator includes a second operation that is equivalent to the first operation. In various embodiments, the compiler can configure the second stream operator to determine at compile time whether a second input is the same as the first input.

In various embodiments of a system, a compiler can determine at compile time whether a first stream operator includes a first operation that is deterministic. In addition, the compiler can determine at compile time whether a second stream operator includes a second operation that is equivalent to the first operation. Further, the compiler can configure the second stream operator at compile time to determine whether a second input is the same as the first input. Moreover, in various embodiments, in response to detecting a change to the operator graph at run time, after compile time, a run time manager can determine whether a first stream operator includes a first operation that is deterministic. In addition, the run time manager can determine whether a second stream operator includes a second operation that is equivalent to the first operation. Further, in response to determining that the first operation is deterministic and the second operation is equivalent to the first operation, the run time manager can configure the first and second stream operators. The run time manager can configure the first stream operator to include in a tuple output from the first stream operator a result of performing the first operation using a first input. The run time manager can configure the second stream operator to determine whether a second input is the same as the first input, wherein the second stream operator is configured to use the second input when performing the second operation. In addition, the run time manager can configure the second stream operator to use the result in lieu of performing the second operation when the second input is the same as the first input.

Yet another embodiment is directed to a computer program product.

BRIEF DESCRIPTION OF THE DRAWINGS

Like reference numbers and designations in the various drawings indicate like elements.

DETAILED DESCRIPTION

Figure 1:
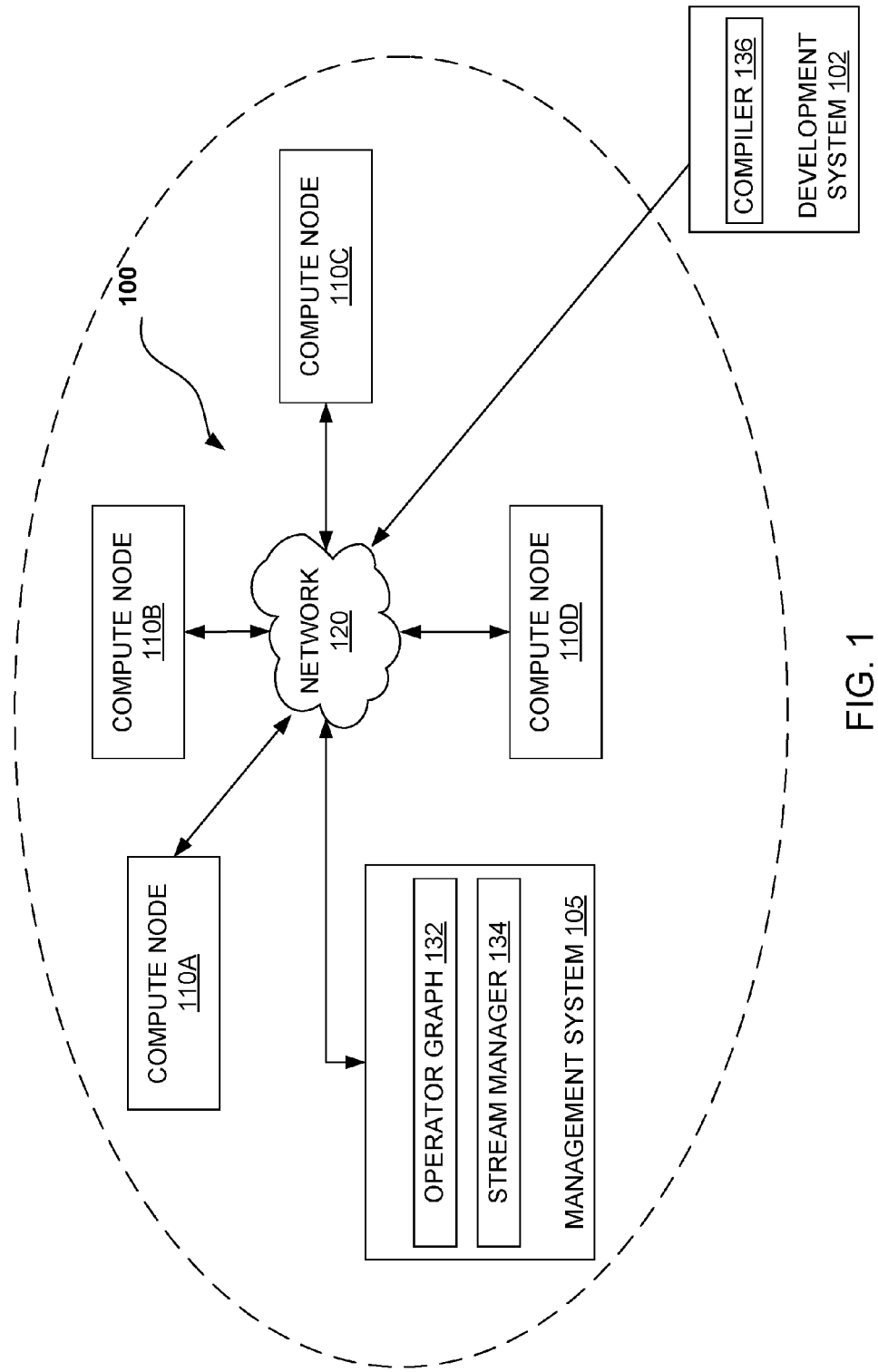
FIG. 1 illustrates a computing infrastructure configured to execute a stream computing application according to various embodiments.

Stream-based computing can include a large number of relatively small blocks of code in many stream operators spread across a large operator graph that can include parallelism and that can dynamically change at run time. For this and for other reasons, it is possible that the same operation can be performed in two or more different parts of the operator graph. According to various embodiments, a determination is made whether a first stream operator performs a particular operation that is deterministic and resource intensive. If the particular operation is deterministic and resource intensive, it is determined whether the same deterministic operation is performed by a second stream operator. If these conditions are met, the first stream operator is configured to include a hidden field in its output tuples. The hidden field contains a result of the particular deterministic operation it performs. This configuration of the first stream operator is subject to a determination at run time that an estimate of processing resources saved is greater than an estimate of costs imposed on a network. In addition, upon receiving a tuple with the hidden field, the second stream operator determines whether the input it is configured to use when it performs the same deterministic operation is the same input that the first stream operator used when it performed the deterministic operation. If the inputs are the same, the second stream operator uses the value in the hidden field in lieu of performing the particular deterministic operation. An advantage of the disclosed embodiments is that processing time and resources may be conserved.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
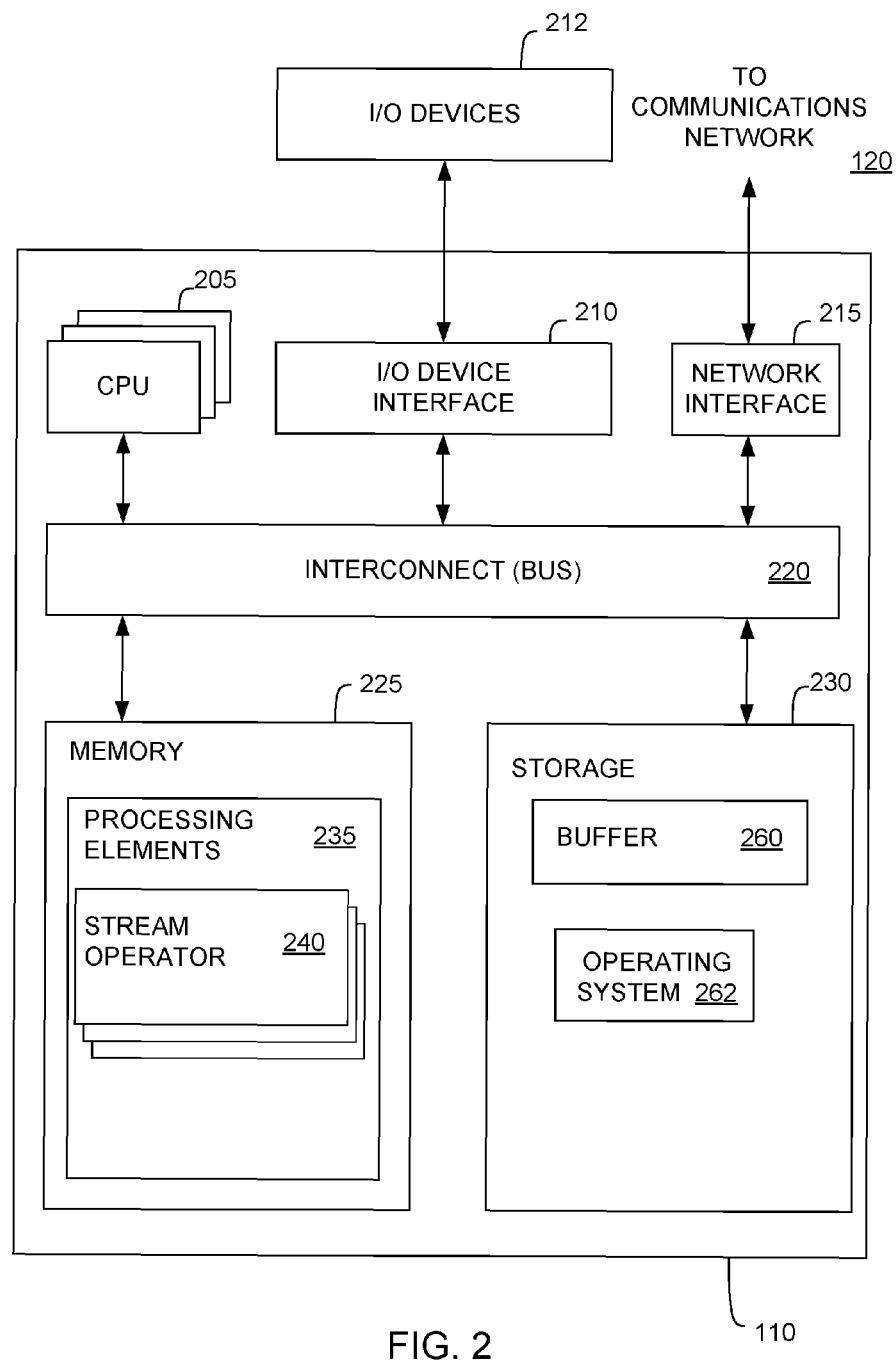
FIG. 2 illustrates a more detailed view of a compute node of FIG. 1 according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
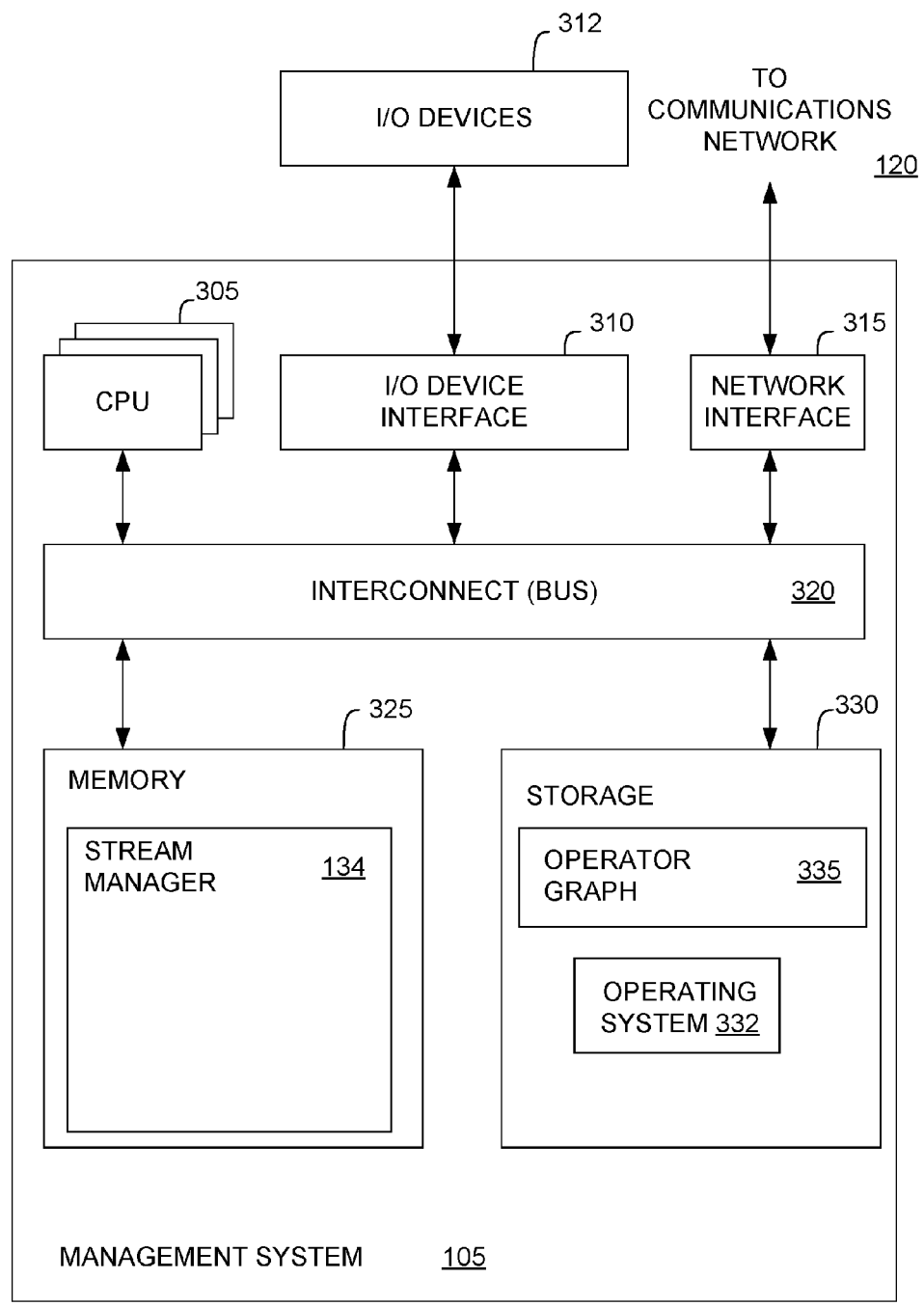
FIG. 3 illustrates a more detailed view of the management system of FIG. 1 according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing.

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
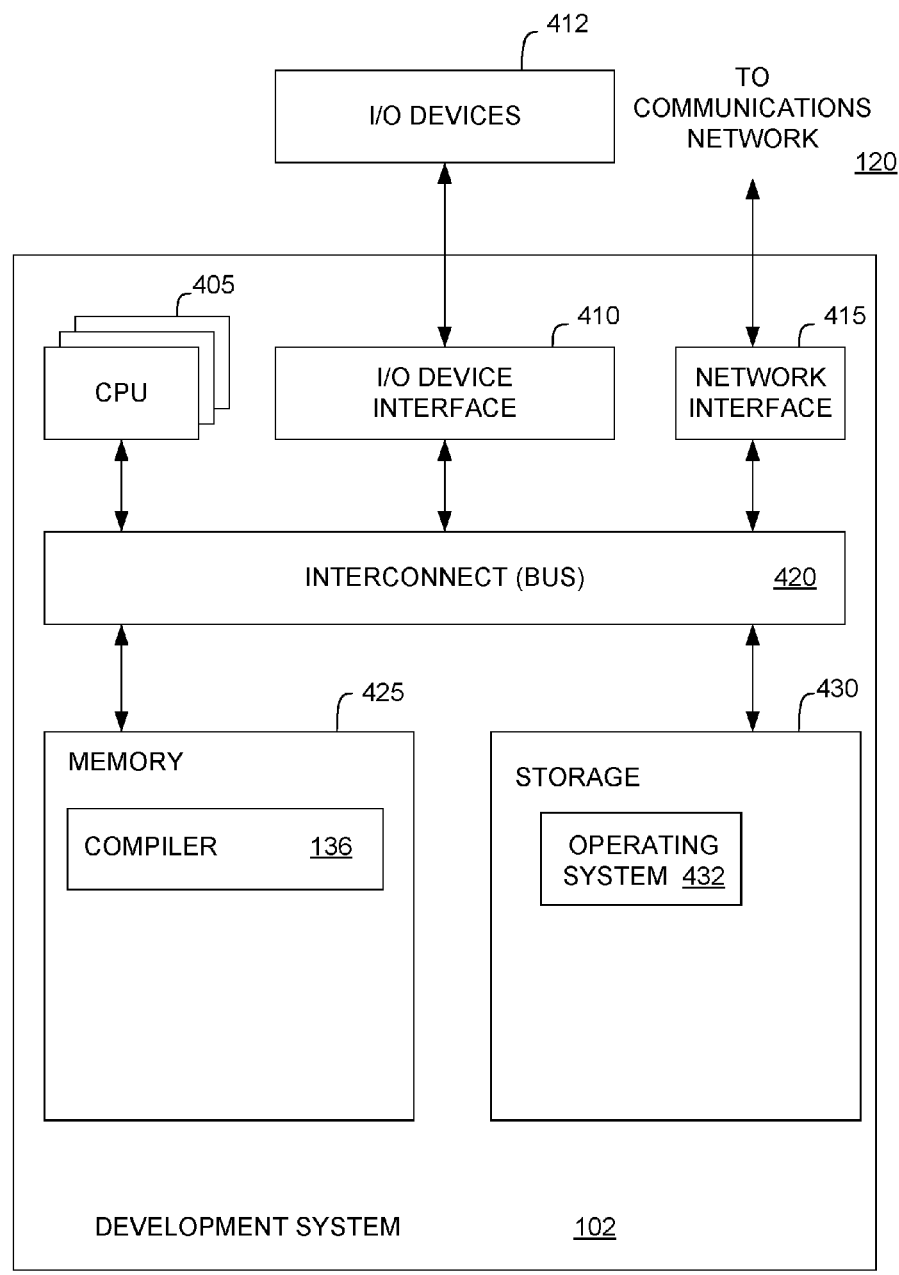
FIG. 4 illustrates a more detailed view of the compiler system of FIG. 1 according to various embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 335.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
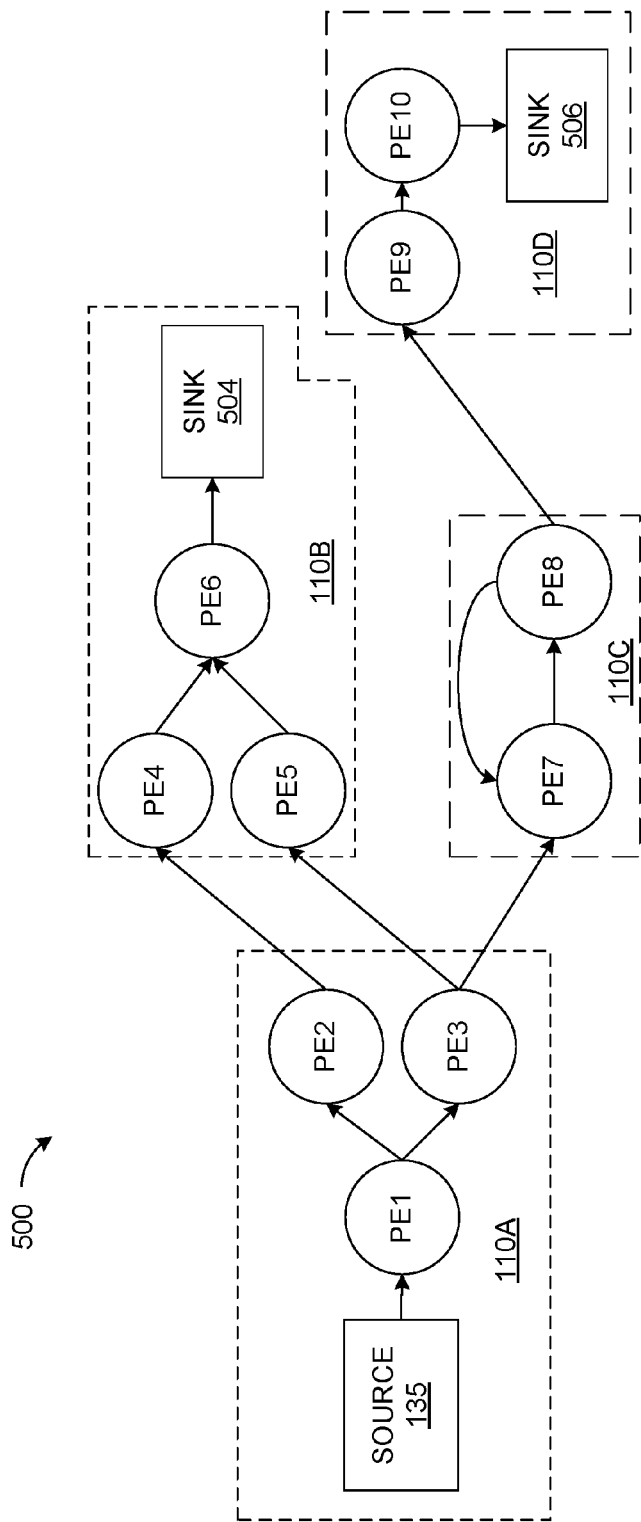
FIG. 5 illustrates an operator graph for a stream computing application according to various embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
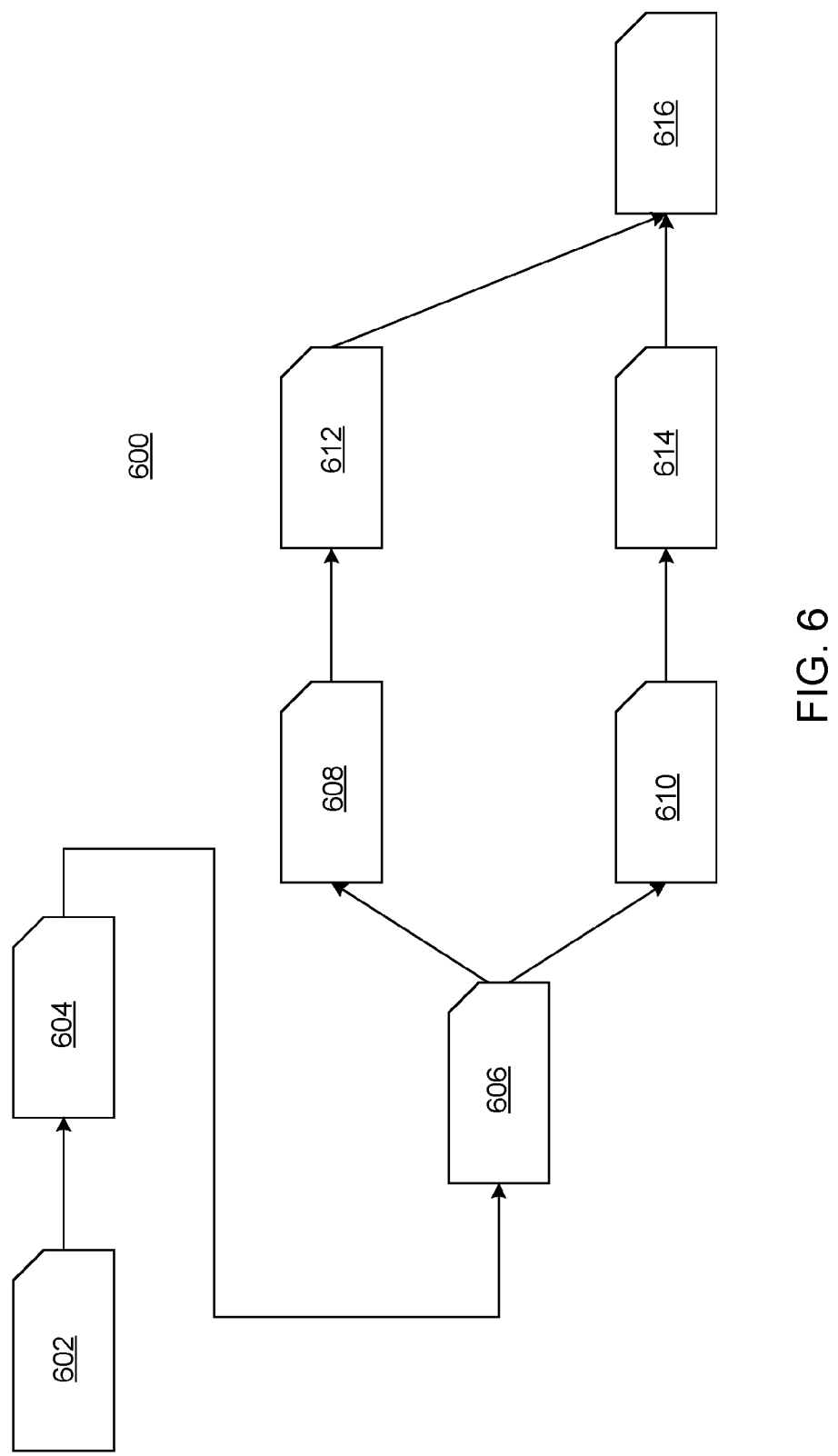
FIG. 6 illustrates a portion of an operator graph at the stream operator level, according to various embodiments.

FIG. 6 is an example of a portion of an operator graph at the stream operator level, according to various embodiments. The operator graph 600 shown in FIG. 6 includes stream operators 602-616, which may be included in one or more processing elements. The processing elements that hold the stream operators 602-616 run in different processes. In addition, the processing elements that hold the stream operators 602-616 can be hosted on different compute nodes.

The operator graph 600 begins at a file source operator 602 and ends at a file sink operator 616. The file source operator 602 receives input data and outputs tuples. The file sink operator 616 can receive tuples and write the tuples to a file.

Tuples output from the file source operator 602 are input to a functor operator 604. The functor operator 604 can transform a tuple received as input into an output tuple that it sends to a split operator 606. The functor operator 604 can be configured to perform various operations. In addition, the functor operator 604 can be configured to modify one or more attributes of the input tuple or add one or more attributes to the input tuple. However, it is not required that the functor operator 604 modify any attribute of an input tuple. Attributes of the input tuple that are not modified by the functor operator 604 may be forwarded without change in an output tuple sent to the split operator 606.

The split operator 606 splits an input stream into two or more output streams based on a specified condition. The split operator 606 forwards a tuple received as input to an output stream without modifying attributes of the tuple. In the operator graph 600, the split operator 606 forwards tuples received as input to either custom operator 608 or custom operator 610. The custom operators 608, 610 can be configured to perform a user-specified operation. Generally, a custom operator does not modify an input tuple. In the example, custom operator 608 forwards its output tuples without modification to an operator 612. Similarly, custom operator 610 forwards its output tuples without modification to a user-defined operator 614. The operators 612 and 614 can be user-defined operators, in which case the operators 612 and 614 can perform any operation specified by a developer. In addition, the operators 612 and 614 can be standard operators provided in a streams processing language. Tuples output from operators 612 and 614 are provided to the file sink operator 616.

In the operator graph 600, the functor operator 604 can be configured to perform a deterministic operation that uses one or more attributes of an input tuple. A deterministic operation is one that will always produce the same output for a particular input. One example of a deterministic operation is an operation that determines whether a particular number is an odd number. Given a particular number as input, the operation will produce the same result every time it is repeated. Other examples of a deterministic operation include an operation that takes a string attribute and outputs an upper-case of the string, takes a price of a product and calculates a tax due on sale of the product, or takes temperature and dew point attributes and calculates a relative humidity.

Stream-based computing can include a large number of relatively small blocks of code in many stream operators spread across a large operator graph that can include parallelism and that can dynamically change at run time. For this and other reasons, it is possible that the same operation can be performed in two or more different parts of the operator graph. According to various embodiments, a determination is made whether a first stream operator performs a particular operation that is deterministic and resource intensive. If the particular operation is deterministic and resource intensive, it is determined whether the same deterministic operation is performed by a second stream operator. If these conditions are met, the first stream operator is configured to include a hidden field in its output tuples. The hidden field contains a result of the particular deterministic operation it performs. This configuration of the first stream operator is subject to a determination at run time that an estimate of processing resources saved is greater than an estimate of costs imposed on a network. In addition, upon receiving a tuple with the hidden field, the second stream operator determines whether the input it is configured to use when it performs the same deterministic operation is the same input that the first stream operator used when it performed the deterministic operation. If the inputs are the same, the second stream operator uses the value in the hidden field in lieu of performing the particular deterministic operation. An advantage of the embodiments is that processing time and resources may be conserved.

Referring again to FIG. 6, assume that the functor operator 604 performs a deterministic operation that uses one or more attributes of an input tuple. According to various embodiments, the functor operator 604 can modify the input tuple using a result of the deterministic operation. Specifically, the functor operator 604 can add a hidden field to the input tuple which contains the result of the deterministic operation. In addition, in various embodiments, metadata can be included tuples output from various stream operators that indicates whether attributes of a tuple were modified or only read by the operator. In various embodiments, the functor operator 604 can generate an identifier or ID for the result of the deterministic operation stored in the hidden field. In these embodiments, the identifier includes the actual input values used in the deterministic operation to obtain the result. These data for determining whether the second input is the same as the first input can also be included in hidden fields. A hidden field may be a field that is not exposed to some stream operators, but which is exposed to other stream operators. If a stream operator does not perform any operation for which the hidden field would be relevant, the stream operator may not read the hidden field. If a stream operator is configured to perform a deterministic operation that may be the same as the one associated with the hidden field, the stream operator can read the hidden field. In other words, a hidden field may only be exposed to a downstream second stream operator configured to use a derived result in lieu of performing the same deterministic operation as a first upstream stream operator.

The split operator 606 receives tuples containing the hidden field holding the result from the functor operator 604 and forwards the tuples without modification to either custom operator 608 or custom operator 610. According to various embodiments, the custom operators 608, 610 are configured to perform the same deterministic operation that the functor operator 604 performs. Upon receipt of a tuple, the custom operators 608, 610 determine whether the result contained in the hidden field was computed using the same input value or values that a respective custom operator 608, 610 is configured to use when it performs the same deterministic operation. The custom operators 608, 610 can make this determination by inspecting metadata for the tuple indicating whether an attribute used as an input value was modified or read only. Alternatively, the custom operators 608, 610 can make this determination by inspecting an identifier in the tuple that includes the actual input value or values used in the deterministic operation to obtain the result.

Figure 7:
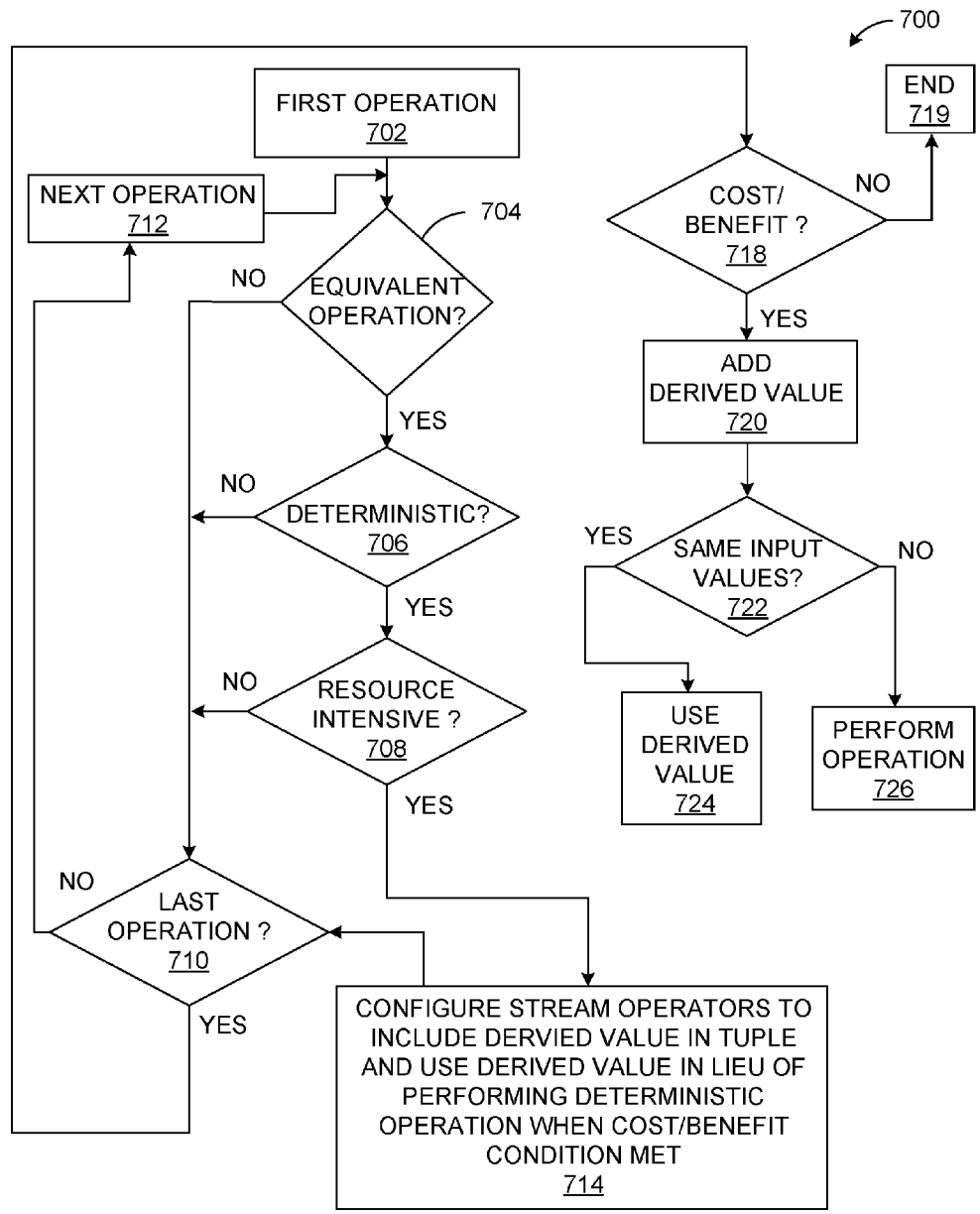
FIG. 7 is a flow diagram of a process according to various embodiments.

FIG. 7 is a flow diagram of a process 700 according to various embodiments. The process 700 begins in operation 702 where a first operation in a stream computing application is selected. The operations 702-714 systematically evaluate all operations in a stream computing application. An individual stream operator may have one or more of the operations that are evaluated. In the following discussion, the operation being evaluated in a particular iteration is referred to as the current operation. In operation 704, it is determined whether there is another operation that is equivalent to the current operation. In addition, it can be determined in operation 704 whether a stream operator having that other operation determined to be equivalent is downstream, upstream, or neither of a stream operator having the current operation. For example, in FIG. 6, the stream operators 608 and 610 are downstream of stream operator 604. Identifying which operator is up or downstream of the other operator determines which operator may be configured to include a derived result in its output tuples and which operator may be configured to use the derived result. For example, if a first operator is identified to be upstream of a second operator, the first operator may be configured to include a derived result in its output tuples and the second operator may be configured to use the derived result. In addition, identifying that neither operator is up or downstream of the other operator indicates that neither operator should be modified.

A current operation can be determined to be equivalent to another operation in a variety of ways. In various embodiments, two or more instances of the same stream operator can be deployed in an operator graph. An operation in one instance of a stream operator will be equivalent to its counterpart in another instance of the stream operator. In some embodiments, an operation can be a single function call. A current operation and another operation that each only include a single call to the same function will be equivalent. In other embodiments, the source code of the current and other operation can be compared to determine equivalence. In still other embodiments, a developer can mark source code for the current and other operations with a designation that the operations are equivalent.

If there is another operation that is equivalent to the current operation, it is determined in operation 706 whether the current operation is deterministic. If the current operation is deterministic, it is determined in operation 708 whether the current operation is resource intensive. In various embodiments, an operation can be determined to be resource intensive based on historical data for the operation. In operation 714, if the current operation is resource intensive, a first stream operator containing one of the two operations (the current operation or the operation determined to be equivalent) may be configured to selectively enable the inclusion of a derived value in its output tuples. The derived value is obtained by performing the deterministic operation using a first input. In addition, the other of the two stream operators, e.g., a second stream operator, is configured to selectively enable use of the derived value in lieu of performing the deterministic operation. The criteria for enabling one or both of the first and second stream operators, in various embodiments, is based on a determination of whether an estimate of savings in processing resources outweighs an estimate of an increase in a network cost. In other words, if an estimate of savings in processing resources outweighs an estimate of an increase in network costs, the first stream operator can be enabled to include derived values in its output tuples and the second stream operator can be enabled to use the derived values (subject to operation 722 described below). On the other hand, if the estimate of savings is less than the estimated increase in network costs, the operators may not be enabled. These cost and savings estimates can be based on historical data.

If any of the determinations in operations 704, 706, and 708 are negative, or if it is determined that tuples are not on a path flowing between the two operators, the process moves to operation 710. In addition, if all of the operations 704, 706, and 708 are positive, the operation 714 is performed, and the process moves to operation 710. In operation 710, it is determined whether the current operation is the last operation. If the current operation is not the last operation, the next operation is located and the operations 704-714 can be repeated for the next operation.

In various embodiments, the operation 714 can be performed in response to determining that the current operation is deterministic and another operation is determined to be equivalent to the current operation. The current operation and other operation are included in different stream operators. If a first one of these two stream operators is upstream of the other, that stream operator can be referred to in this description of operation 714 as a first stream operator and the downstream stream operator can be referred to a second stream operator. According to various embodiments, the operation 714 can include configuring the first stream operator to include in a tuple output from the first stream operator a result of performing the first operation using a first input. In addition, the operation 714 can include configuring the second stream operator to determine whether a second input the second stream operator is configured to use when performing the second operation is the same as the first input. The second stream operator can be configured to use the result in lieu of performing the second operation when the second input is the same as the first input and when the cost/benefit condition of operation 718 is met.

When all of the operations in the operator graph have been evaluated and operations meeting the specified tests have been selectively configured, the process moves to operation 718. In operation 718, it is determined whether the cost/benefit criteria discussed above is met. For example, if an estimated savings in processing time and resources outweighs an estimated cost of the increased network traffic, the process moves to operation 720. Otherwise, the process may end in operation 719.

In operation 720, the first stream operator, that is the upstream stream operator, which is configured to include results of performing the first operation in its output tuples begins outputting tuples. These tuples flow to the second stream operator. The second stream operator can perform the operations 722-726.

In operation 722, it is determined whether the input value (or values) used by the first stream operator when it performed the deterministic operation is the same as the input value (or values) that the second stream operator would use if it were to perform the same operation. The second stream operator can make this determination by inspecting metadata for the tuple indicating whether an attribute used as an input was modified or read only. Alternatively, the second operator can make this determination by inspecting an identifier in the tuple that includes the actual input values used in the deterministic operation. If the input values are the same, the second stream operator can use the result of the deterministic operation included in the tuple in lieu of performing the same deterministic operation (operation 726). Otherwise, if the input values are different, the second stream operator can perform the same deterministic operation but using its own unique input values (operation 726).

In various embodiments, the operations 702-714 can be performed by the compiler 136 at compile time. The operations 718-726 can then be performed at run time by the stream manager 134 and the configured stream operators.

Figure 8:
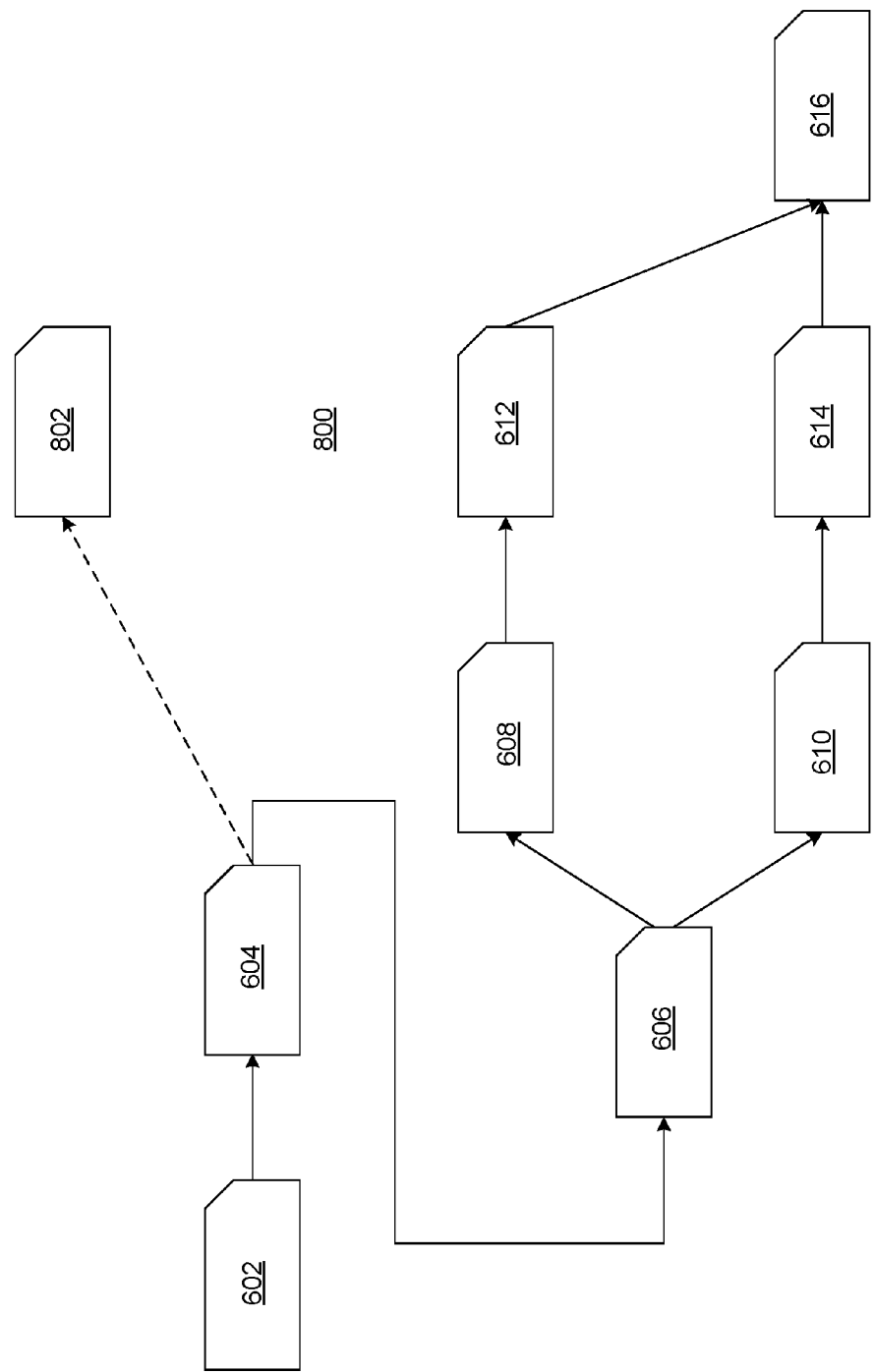
FIG. 8 is a block diagram of the operator graph of FIG. 6 illustrating a stream operator attached subsequent to the operator graph being deployed.

However, not all connections between operators may be known at compile time. In addition, after an operator graph is compiled and deployed, various circumstances can cause the operator graph to change. As one example, subsequent to an operator graph being deployed, a second job can cause additional stream operators to attach to the operator graph. FIG. 8 presents an example of this situation. FIG. 8 is a block diagram at the stream operator level of the operator graph portion depicted in FIG. 6. In the operator graph 800 shown in FIG. 8, a second job has caused the stream operator 802 to attach to the functor operator 604.

In various embodiments, the operations 702-714 can be performed at run time, after compile time, in response to detecting a change in a deployed operator graph. Performing operations 702-714 can result in determining that the stream operator 802 in FIG. 8 includes a resource-intensive, deterministic operation that is equivalent to the resource-intensive, deterministic operation in functor operator 604. As a result, the stream operator 802 can be selectively configured to use a derived value or result in lieu of performing the same deterministic operation performed in functor operator 604. In various embodiments, the stream manager 134 or another run time component can be configured to perform operations 702-714 at run time in response to detecting a change in a deployed operator graph.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

Aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the computer program product may include a computer readable storage medium (or media) having computer readable program instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and a streams programming language, such as IBM Streams Processing Language (SPL). The program code may execute as specifically described herein. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although embodiments are described within the context of a stream computing application, this is not the only context relevant to the present disclosure. Instead, such a description is without limitation and is for illustrative purposes only. Additional embodiments may be configured to operate with any computer system or application capable of performing the functions described herein. For example, embodiments may be configured to operate in a clustered environment with a standard database processing application. A multi-nodal environment may operate in a manner that effectively processes a stream of tuples. For example, some embodiments may include a large database system, and a query of the database system may return results in a manner similar to a stream of data.

While the foregoing is directed to exemplary embodiments, other and further embodiments of the disclosure may be devised without departing from the basic scope thereof, and the scope thereof is determined by the claims that follow.

What is claimed is:

1. A computer program product for processing a stream of tuples, the computer program product comprising a computer readable storage medium having program code embodied therewith, the program code comprising computer readable program code configured to cause one or more processors to:
   receive a stream of tuples to be processed by a plurality of processing elements operating on one or more computer processors, each processing element having one or more stream operators, the stream operators being arranged in an operator graph;
   determine whether a first stream operator includes a first operation that is deterministic, wherein a deterministic operation is one that always produces a same output for a given input;
   determine whether a second stream operator includes a second operation that is equivalent to the first operation, wherein the second operation is equivalent to the first operation if the first stream operator and the second stream operator are identical stream operator instances arranged in the operator graph and the first operation and the second operation are identical counterparts of each other in their respective stream operators; and,
   in response to determining that the first operation is deterministic and the second operation is equivalent to the first operation,
   configure the first stream operator to include, in a tuple output from the first stream operator, a result of performing the first operation using a first input, and
   configure the second stream operator to:
      determine whether a second input is the same as the first input, wherein the second stream operator is configured to use the second input when performing the second operation, and wherein the second input is the same as the first input if the first input and the second input have identical values, and
      use the result in lieu of performing the second operation when the second input is the same as the first input, wherein using the result in lieu of performing the second operation comprises including, in a tuple output from the second stream operator, the result without performing the second operation using the second input.

2. The computer program product of claim 1, wherein the program code is further configured to:
   determine whether the first operation is resource intensive; and
   determine whether an estimate of processing resources savings from omitting performance of the second operation is greater than an estimate of a cost imposed on a network from inclusion in the tuple output from the first stream operator the result of performing the first operation.

3. The computer program product of claim 1, wherein the configuring the first stream operator to include, in a tuple output from the first stream operator, a result of performing the first operation further comprises including the result in a hidden field of the tuple.

4. The computer program product of claim 1, wherein the configuring the first stream operator to include, in a tuple output from the first stream operator, a result of performing the first operation further comprises including data for determining whether the second input is the same as the first input.

5. The computer program product of claim 1, further comprising determining that the second stream operator is downstream of the first stream operator.

6. The computer program product of claim 1, wherein:
   the determining whether a first stream operator includes a first operation that is deterministic,
   the determining whether a second stream operator includes a second operation that is equivalent to the first operation, and
   the configuring of the first and second stream operators are performed at run time.

7. The computer program product of claim 1, wherein:
   the determining whether a first stream operator includes a first operation that is deterministic, the determining whether a second stream operator includes a second operation that is equivalent to the first operation, and the configuring the second stream operator to determine whether a second input is the same as the first input are performed at compile time.

8. A system for processing a stream of tuples, comprising:

a plurality of processing elements to receive a stream of tuples, the processing elements operating on one or more computer processors, each processing element having one or more stream operators, the stream operators being arranged in an operator graph; and a component, operating on a computer processor, to:

determine whether a first stream operator includes a first operation that is deterministic, wherein a deterministic operation is one that always produces a same output for a given input;

determine whether a second stream operator includes a second operation that is equivalent to the first operation, wherein the second operation is equivalent to the first operation if the first stream operator and the second stream operator are identical stream operator instances arranged in the operator graph and the first operation and the second operation are identical counterparts of each other in their respective stream operators; and, in response to determining that the first operation is deterministic and the second operation is equivalent to the first operation, configure by the component the first stream operator to include, in a tuple output from the first stream operator, a result of performing the first operation using a first input, and configure the second stream operator to:

determine whether a second input is the same as the first input, wherein the second stream operator is configured to use the second input when performing the second operation, and wherein the second input is the same as the first input if the first input and the second input have identical values, and use the result in lieu of performing the second operation when the second input is the same as the first input, wherein using the result in lieu of performing the second operation comprises including, in a tuple output from the second stream operator, the result without performing the second operation using the second input.

9. The system of claim 8, wherein the component further determines whether the first operation is resource intensive.

10. The system of claim 8, wherein the component further determines whether an estimate of processing resources savings from omitting performance of the second operation is greater than an estimate of a cost imposed on a network from inclusion, in the tuple output from the first stream operator, the result of performing the first operation.

11. The system of claim 8, wherein the configuring the first stream operator to include, in a tuple output from the first stream operator, a result of performing the first operation further comprises including the result in a hidden field of the tuple.

12. The system of claim 8, wherein the configuring the first stream operator to include, in a tuple output from the first stream operator, a result of performing the first operation further comprises including data for determining whether the second input is the same as the first input.

13. The system of claim 8, wherein the component further determines that the second stream operator is downstream of the first stream operator.

14. The system of claim 8, wherein:

the component is a stream manager, and the stream manager:

determines whether a first stream operator includes a first operation that is deterministic, determines whether a second stream operator includes a second operation that is equivalent to the first operation, and configures of the first and second stream operators at run time.

15. The system of claim 8, wherein:

the component is a compiler, and the compiler:

determines whether a first stream operator includes a first operation that is deterministic, determines whether a second stream operator includes a second operation that is equivalent to the first operation, and configures the second stream operator to determine whether a second input is the same as the first input at compile time.

16. A computer program product for processing a stream of tuples, the computer program product comprising a computer readable storage medium having program code embodied therewith, the program code comprising computer readable program code configured to cause one or more processors to perform a method comprising:

receiving a stream of tuples to be processed by a plurality of processing elements operating on two or more computer processors, each processing element having one or more stream operators, the stream operators being arranged in an operator graph;

determining, at compile time, whether a first stream operator includes a first operation that is deterministic;

determining, at compile time, whether a second stream operator includes a second operation that is equivalent to the first operation;

determining, at compile time, whether the second stream operator is downstream of the first stream operator;

determining, at compile time, whether the first operation is resource intensive;

in response to determining that the first operation is deterministic, the second operation is equivalent to the first operation, the second stream operator is downstream of the first stream operator, and the first operation is resource intensive:

configuring the first stream operator, at compile time, to selectively include, in a first tuple output from the first stream operator, a first result of performing the first operation using a first input, the first result being included in a hidden field of the first tuple, and to include data for determining whether a second input is the same as the first input, and configuring the second stream operator, at compile time, to selectively determine whether the second input is the same as the first input, wherein the second stream operator is configured to use the second input when performing the second operation, and use the first result in lieu of performing the second operation when the second input is the same as the first input;

determining, at run time, whether an estimate of processing resources savings from omitting performance of the second operation by the second stream operator is greater than an estimate of cost imposed on a network from inclusion, in the first tuple output from the first stream operator, the first result of performing the first operation; and in response to determining that the estimate of processing resources savings is greater than the estimate of cost imposed on a network, performing the following at run time:

outputting the first tuple from the first stream operator, the first tuple including the first result of performing the first operation using the first input in a hidden field, and the data for determining whether the second input is the same as the first input, determining, by the second stream operator, whether the second input is the same as the first input, the determining of whether the second input is the same as the first input using the data for determining whether the second input is the same as the first input, and using, by the second stream operator, the first result in lieu of performing the second operation when the second input is the same as the first input.

\* \* \* \* \*